(12) United States Patent
Lindén et al.

(10) Patent No.: US 10,398,088 B2
(45) Date of Patent: Sep. 3, 2019

(54) PRUNING SHEARS WITH FRUSTO-CONICAL WHEEL

(71) Applicant: Fiskars Finland Oy Ab, Helsinki (FI)

(72) Inventors: Olavi Lindén, Helsinki (FI); Jan Lindén, Helsinki (FI)

(73) Assignee: Fiskars Finland Oy Ab, Helsinki (FI)

( * ) Notice: Subject to any disclaimer, the term of this patent is extended or adjusted under 35 U.S.C. 154(b) by 24 days.

(21) Appl. No.: 15/612,626

(22) Filed: Jun. 2, 2017

(65) Prior Publication Data
US 2017/0354095 A1    Dec. 14, 2017

(30) Foreign Application Priority Data

Jun. 13, 2016 (FI) .................................. 20165489

(51) Int. Cl.
*A01G 3/025* (2006.01)
(52) U.S. Cl.
CPC .................................. *A01G 3/0255* (2013.01)
(58) Field of Classification Search
CPC ........ A01G 3/025; A01G 3/0255; A01G 3/08; A01G 3/081; Y10T 74/20426
USPC ......... 30/249, 251, 173, 175, 186, 187, 188, 30/296.1; 74/89.22, 502
See application file for complete search history.

(56) References Cited

U.S. PATENT DOCUMENTS

| | | | |
|---|---|---|---|
| 599,214 A * | 2/1898 | Bateman | B60P 7/083 254/218 |
| 1,246,685 A * | 11/1917 | Unruh | A01G 3/025 30/249 |
| 1,507,225 A * | 9/1924 | Barrett | A01G 3/0255 30/249 |
| 1,572,100 A * | 2/1926 | Blodgett | A01G 3/0255 30/251 |
| 2,241,679 A * | 5/1941 | Taylor | A01G 3/0255 74/502 |
| 2,491,341 A * | 12/1949 | Tillman | Y10T 74/18848 74/89.22 |
| 3,204,480 A * | 9/1965 | Bradbury | Y10T 74/19181 74/502.3 |

(Continued)

FOREIGN PATENT DOCUMENTS

KR    2020120003461    5/2012

OTHER PUBLICATIONS

Translation of Official Action Received for Korean Application No. 10-2017-0069745, dated Apr. 6, 2018, 5 pages.

*Primary Examiner* — Andrea L Wellington
*Assistant Examiner* — Samuel A Davies
(74) *Attorney, Agent, or Firm* — Foley & Lardner LLP

(57) ABSTRACT

Pruning shears include a cutting head with a spring-biased blade; a driving line connected at a first end to the blade; an elongated body; a handle; and a frusto-conical shaped wheel connected rotatably to the handle. The diameter of the wheel at a first end being smaller than the diameter at a second end. The line is wound into a spiral groove around the wheel at the first end; a second end of the line is attached to a second end of the elongated body; and the line wound around the wheel moves toward the second end of the wheel when unwinding a part of the line from around the wheel and winding another part of the line around the wheel for decreasing the distance between the first and second ends of the line, resulting in movement of the blade in relation to the jaw, when the handle is moved.

4 Claims, 1 Drawing Sheet

(56) References Cited

U.S. PATENT DOCUMENTS

| | | | | |
|---|---|---|---|---|
| 5,950,315 A | * | 9/1999 | Linden | A01G 3/0255 |
| | | | | 30/188 |
| 6,345,445 B1 | | 2/2002 | Schofield | |
| 2009/0038162 A1 | * | 2/2009 | Shan | A01G 3/0255 |
| | | | | 30/249 |
| 2010/0299938 A1 | * | 12/2010 | Wu | A01G 3/0255 |
| | | | | 30/249 |
| 2015/0020669 A1 | * | 1/2015 | Gass | B23D 45/068 |
| | | | | 83/477.1 |

* cited by examiner

PRUNING SHEARS WITH FRUSTO-CONICAL WHEEL

CROSS-REFERENCE TO RELATED APPLICATIONS

This application claims the benefit of and priority to Finland Patent Application No. 20165489, filed Jun. 13, 2016, the entire contents of which are incorporated herein by reference.

FIELD

The present disclosure relates to garden tools, and particularly to pruning shears.

BACKGROUND

In the traditional pruning shears the means for providing mechanical advantage from the movement of a handle to the movement of the blade is located in the cutting head close to the blade.

A problem with the traditional pruning shears is that the means for providing mechanical advantage makes the cutting head big and heavy, thus hindering the usage of the pruning shears. Heavy weight positioned at the end of a long arm makes the pruning shears difficult to handle. On the other hand a big cutting head makes it difficult to fit the cutting head between branches to a desired position.

Another problem is that the efficiency of the traditional pruning shears is usually low. Plain sheave bearings and small sheave diameter compared to rope diameter result in loss of energy, which is usually about 50%. They also comprise many parts, thus making them complex, expensive to assemble and challenging to maintenance.

BRIEF DESCRIPTION

An object of the present disclosure is to provide a pruning shears so as to solve the above problems.

The objects of the disclosure are achieved by pruning shears which are characterized by what is stated in the independent claims. The preferred embodiments of the disclosure are disclosed in the dependent claims.

The disclosure is based on the idea of providing the mechanical advantage with a wheel having a frusto-conical shape connected rotatably to the handle of the pruning shears. The wheel comprises a spiral groove for receiving a driving line. The driving line is arranged into the spiral groove and wound around the wheel along the spiral groove at the narrow end of the wheel. The driving line wound around the wheel is arranged to move towards the wide end of the wheel as a result of unwinding of a part of the driving line from around the wheel and winding of another part of the driving line to around the wheel for decreasing the distance between the first end of the driving line connected to a spring-biased blade and the second end of the driving line connected to an end of a body of the pruning shears resulting in a movement of the spring-biased blade in relation to a jaw of the pruning shears, when the handle is moved along the body of the pruning shears.

An advantage of pruning shears of the disclosure is that it allows smaller size of the cutting head because the means for providing mechanical advantage is located away from the cutting head. Also, the friction losses of the pruning shears is minimal, thus providing an efficiency of as high as 90%.

The number of parts in the pruning shears of the disclosure is also considerably smaller than in traditional pruning shears, thus making the maintenance and replacement of parts easier.

BRIEF DESCRIPTION OF THE DRAWINGS

In the following the disclosure will be described in greater detail by means of preferred embodiments with reference to the accompanying drawings, in which.

DETAILED DESCRIPTION

Figure 1:
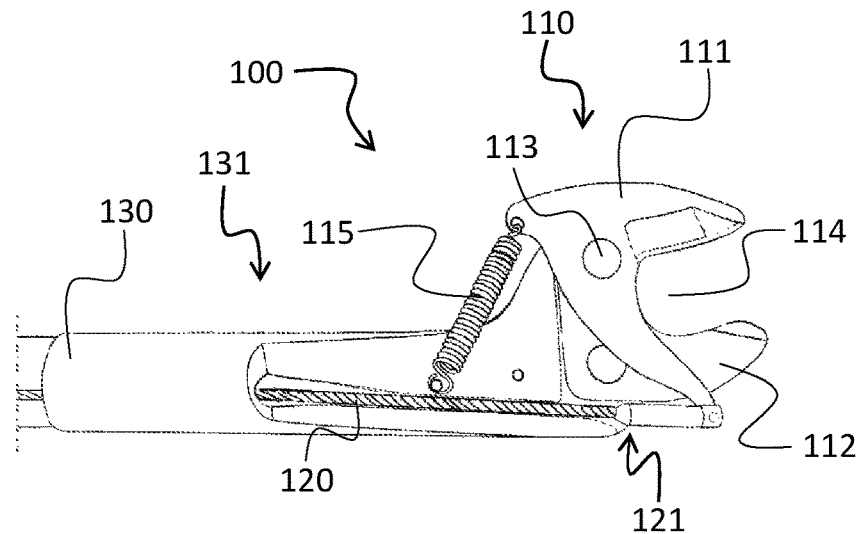
FIG. 1 illustrates a part of the pruning shears according to an embodiment.

The disclosure relates to pruning shears 100. The pruning shears 100 comprise a cutting head 110 with a spring-biased blade 111 pivotally connected to a jaw 112 about a pivot point 113. In other words the blade 111 is biased by a spring 115. The jaw 112 cooperates with the spring-biased blade 111 to sever a workpiece received in a bight 114 formed by the jaw 112. The cutting head 110 is illustrated in FIG. 1.

The pruning shears 100 comprise a driving line 120 connected at a first end 121 of the driving line 120 to the spring-biased blade 111 at a distance from the pivot point 113. For example the driving line 120 comprises a steel wire, a rope or a roller chain.

The pruning shears 100 comprise an elongated body 130 for supporting the cutting head 110 at a first end 131 of the elongated body 130. The purpose of the elongated body 130 is to support the parts of the pruning shears 100 and to allow the user to reach tree branches that are high up from the ground.

Figure 2:
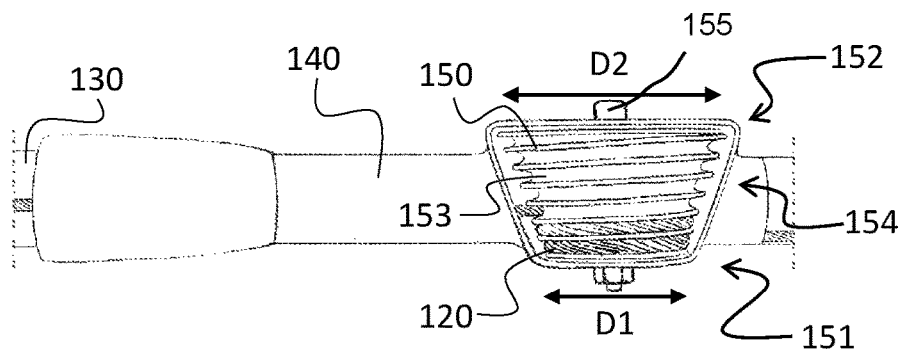
FIG. 2 illustrates a part of the pruning shears according to an embodiment.

The pruning shears 100 comprise a handle 140 connected movably to the elongated body 130. For example the handle 140 is arranged slidably along the elongated body 130. The handle 140 may be arranged around the elongated body 130. The handle 140 allows the user of the pruning shears 100 to operate the spring-biased blade 111. The handle 140 is illustrated in FIG. 2.

The pruning shears 100 comprise a wheel 150 having a frusto-conical shape connected rotatably to the handle 140 so that the rotation axis of the wheel 150 is transversal to the elongated body 130. For example the wheel 150 is connected to the handle 140 by a pin joint 155. In other words the wheel 150 is arranged to move with the handle 140, when the handle 140 is moved in relation to the elongated body 130.

The wheel 150 comprises a first end 151 and a second end 152. The diameter D1 of the wheel 150 at the first end is smaller than the diameter D2 of the wheel 150 at the second end. The wheel 150 comprises a spiral groove 153 arranged in a surface 154 of the wheel 150 for receiving the driving line 120 into the spiral groove 153. In other words the spiral groove 153 is arranged to wrap around the surface of the cone. Preferably the spiral groove 153 is arranged to extend from the first end 151 of the wheel 150 to the second end 152 of the wheel 150 over the whole surface 154 of the wheel 150.

The driving line 120 extends along an outer surface of the elongated body 130. The driving line 120 is arranged into the spiral groove 153 and wound at least once around the wheel 150 along the spiral groove 153 at the first end 151 of the wheel 150. According to an embodiment the driving line 120 is wound at least twice around the wheel 150. Winding the driving line 120 twice or more times around the wheel 150 reduces slipping of the driving line 120 in relation to the wheel 150 over time.

Figure 3:
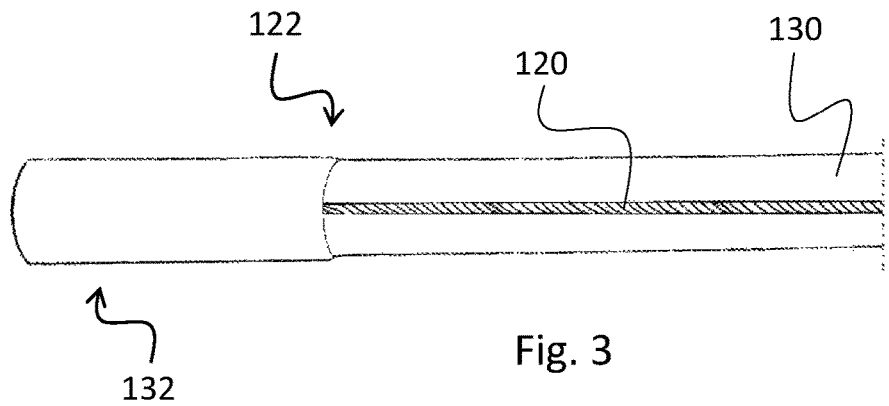
FIG. 3 illustrates a part of the pruning shears according to an embodiment.

A second end 122 of the driving line 120 is attached to a second end 132 of the elongated body 130. In this case the second end 132 of the elongated body 130 means any part of the elongated body 130 that is located at a distance from the handle 140 in the direction away from the first end 131 of the elongated body 130. In other words the second end 122 of the driving line 120 can be attached to a very end of the second end 132 of the elongated body 130, but it can also be attached to the elongated body 130 to a part of the elongated body 130 located towards the handle 140 from the very end of the second end 132 of the elongated body 130. It is preferable to attach the driving line 120 close to the very end of the second end 132 of the elongated body 130 for allowing sufficient movement of the handle 140, if the blade is operated by moving the handle 140 towards the second end 132 of the elongated body 130. The second end 132 of the elongated body 130 is illustrated in FIG. 3.

The driving line 120 wound around the wheel 150 is arranged to move towards the second end 152 of the wheel 150 as a result of unwinding of a part of the driving line 120 from around the wheel 150 and winding of another part of the driving line 120 to around the wheel 150 for decreasing the distance between the first end 121 of the driving line 120 and the second end 122 of the driving line 120 resulting in a movement of the spring-biased blade 111 in relation to the jaw 112, when the handle 140 is moved along the elongated body 130. In other words, when the handle 140 is moved, the part of the driving line 120 unwinding from the wheel 150 forces the wheel 150 to rotate, thus causing the other part of the driving line 120 to wind around the wheel 150. Because the diameter of the wheel 150, where the driving line 120 is wound around the wheel 150, is larger than the diameter of the wheel 150, where the driving line 120 is unwound from the wheel 150, the wound part of the driving line 120 requires more of the overall length of the driving line 120, thus resulting in decreasing in the distance between the first end 121 of the driving line 120 and the second end 122 of the driving line 120. Because the second end 122 of the driving line 120 is attached to the second end 132 of the elongated body 130, the force of the spring 115 is overcome by the force acting upon the driving line 120, resulting in rotation of the blade about the pivot point 113. When the handle 140 is released, the force acting upon the driving line 120 is overcome by the force caused by the spring 115, thus returning the blade and the handle 140 to their original positions. Simultaneously the driving line 120 wound around the wheel 150 moves back towards the first end 151 of the wheel 150.

Preferably the blade is operated by moving the handle 140 towards the second end 132 of the elongated body 130. According to an embodiment the driving line 120 wound around the wheel 150 is arranged to move towards the second end 152 of the wheel 150 for decreasing the distance between the first end 121 of the driving line 120 and the second end 122 of the driving line 120 resulting in a movement of the spring-biased blade 111 in relation to the jaw 112, when the handle 140 is moved towards the second end 132 of the elongated body 130.

What is claimed is:

1. Pruning shears comprising:
   a cutting head with a spring-biased blade pivotally connected to a jaw about a pivot point, the jaw cooperating with the spring-biased blade to sever a workpiece received in a bight formed by the jaw;
   a driving line connected at a first end of the driving line to the spring-biased blade at a distance from the pivot point;
   an elongated body for supporting the cutting head at a first end of the elongated body, said driving line extending along an outer surface of the elongated body;
   a handle arranged around the elongated body for connecting the handle movably to the elongated body; and
   a wheel having a frusto-conical shape connected rotatably to the handle via a first end of the wheel and a second end of the wheel so that the rotation axis of the wheel is transverse to the elongated body; wherein:
      a diameter of the wheel at the first end being smaller than a diameter of the wheel at the second end;
      the wheel comprises a spiral groove arranged in a surface of the wheel for receiving the driving line into the spiral groove;
      the driving line is arranged into the spiral groove and wound at least once around the wheel along the spiral groove at the first end of the wheel;
      a second end of the driving line is attached to a second end of the elongated body; and
      the driving line wound around the wheel is arranged to move towards the second end of the wheel as a result of unwinding of a part of the driving line from around the wheel and winding of another part of the driving line to around the wheel for decreasing the distance between the first end of the driving line and the second end of the driving line resulting in a movement of the spring-biased blade in relation to the jaw, when the handle is moved along the elongated body.

2. Pruning shears according to claim 1, wherein the driving line comprises a steel wire.

3. Pruning shears according to claim 1, wherein the driving line is wound at least twice around the wheel.

4. Pruning shears according to claim 1, wherein the driving line wound around the wheel is arranged to move towards the second end of the wheel for decreasing the distance between the first end of the driving line and the second end of the driving line resulting in a movement of the spring-biased blade in relation to the jaw, when the handle is moved towards the second end of the elongated body.

* * * * *